US010564689B2

(12) United States Patent
Heo et al.

(10) Patent No.: US 10,564,689 B2
(45) Date of Patent: Feb. 18, 2020

(54) METHOD FOR MANAGING POWER FOR POWER FAILURE PREVENTION BASED ON SMART PLUG AND APPARATUS USING THE SAME

(71) Applicant: Electronics and Telecommunications Research Institute, Daejeon (KR)

(72) Inventors: Se-Wan Heo, Daejeon (KR); Wan-Ki Park, Daejeon (KR); Il-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 229 days.

(21) Appl. No.: 15/650,288

(22) Filed: Jul. 14, 2017

(65) Prior Publication Data

US 2018/0188788 A1    Jul. 5, 2018

(30) Foreign Application Priority Data

Jan. 5, 2017 (KR) .................. 10-2017-0001838

(51) Int. Cl.
| | |
|---|---|
| G06F 1/26 | (2006.01) |
| G06F 1/28 | (2006.01) |
| G06F 1/32 | (2019.01) |
| H02J 3/14 | (2006.01) |
| H02J 9/06 | (2006.01) |

(Continued)

(52) U.S. Cl.
CPC .............. *G06F 1/28* (2013.01); *G06F 1/263* (2013.01); *G06F 1/3206* (2013.01); *H02J 3/14* (2013.01); *H02J 3/383* (2013.01); *H02J 9/06* (2013.01); *Y02B 10/72* (2013.01); *Y02B 70/3225* (2013.01);

(Continued)

(58) Field of Classification Search
USPC ......................................................... 307/44
See application file for complete search history.

(56) References Cited

U.S. PATENT DOCUMENTS

| | | | |
|---|---|---|---|
| 2011/0006607 A1 | 1/2011 | Kwon et al. | |
| 2011/0196547 A1* | 8/2011 | Park ............... | G06Q 50/06 |
| | | | 700/296 |

(Continued)

FOREIGN PATENT DOCUMENTS

| | | |
|---|---|---|
| KR | 1020150057728 A | 5/2015 |
| KR | 1020160001249 A | 1/2016 |
| KR | 101656437 B1 | 9/2016 |

*Primary Examiner* — Rexford N Barnie
*Assistant Examiner* — Xuan Ly
(74) *Attorney, Agent, or Firm* — William Park & Associates Ltd.

(57) ABSTRACT

Disclosed herein are a smart plug-based power management method for preventing a power failure and an apparatus for the method. The power management method includes acquiring load amount information for each of multiple loads corresponding to power management targets, checking a maximum amount of power that is capable of being generated by a solar power generator, setting a power supply mode based on at least one of whether power is being supplied from a power system and a result of a comparison of the load amount information with the maximum amount of power, and performing power management so as to prevent a power failure by interrupting a supply of power so as to correspond to the power supply mode based on multiple smart plugs for controlling corresponding ones of the multiple loads.

18 Claims, 7 Drawing Sheets

(51) Int. Cl.
*G06F 1/3206* (2019.01)
*H02J 3/38* (2006.01)

(52) U.S. Cl.
CPC ........... *Y02E 10/563* (2013.01); *Y02E 10/566* (2013.01); *Y04S 20/222* (2013.01)

(56) References Cited

U.S. PATENT DOCUMENTS

| | | |
|---|---|---|
| 2015/0137698 A1 | 5/2015 | Kim et al. |
| 2015/0205316 A1 | 7/2015 | Choi et al. |
| 2016/0141879 A1* | 5/2016 | Motsenbocker .......... G05F 1/67 307/18 |
| 2018/0037131 A1* | 2/2018 | Son ..................... B60L 11/1861 |

* cited by examiner

METHOD FOR MANAGING POWER FOR POWER FAILURE PREVENTION BASED ON SMART PLUG AND APPARATUS USING THE SAME

CROSS REFERENCE TO RELATED APPLICATION

This application claims the benefit of Korean Patent Application No. 10-2017-0001838, filed Jan. 5, 2017, which is hereby incorporated by reference in its entirety into this application.

BACKGROUND OF THE INVENTION

1. Technical Field

The present invention relates generally to power management technology for preventing a power failure, and more particularly to a smart plug-based power management method for preventing a power failure and an apparatus for the method, which is configured such that, when a power system fails, power is supplied through a solar power generator but power is partially supplied based on a smart plug, whereby power failure may be prevented in advance.

2. Description of the Related Art

When facilities fail or when power demand exceeds a system power supply capacity, the supply of power to some areas is unavoidably interrupted, thus causing a power failure. In the areas in which a power failure has occurred, the supply of power is interrupted for a certain time and the minimum amount of power that is essential may not be supplied.

These days, in order to respond to such a situation, solar power generation is being used in conjunction with power systems. Generally, solar power generation is configured to supply the maximum amount of power that can be generated using a maximum power extraction algorithm, which may reduce the total load on the premises of a consumer. However, because a solar power generator is operated in conjunction with a power system and installed such that the amount of power generated therefrom does not exceed the total load amount of the premises of a customer, solar power generation is inadequate to sufficiently supply power to the loads in the premises of the customer.

Recently, in order to solve this problem, a solar power generator for homes and a smart plug for power management have come into wide use, but these are not a means for preventing a power failure because these are intended for constant use in conjunction with a power system.

Korean Patent Application Publication No. 10-2015-0057728 discloses a method in which whether to turn on or off multiple smart plugs is determined based on their priorities depending on the amount of power supplied from a system, whereby only some selected smart plugs are operated. However, this method is ineffective because only a minimum number of devices is operated unconditionally in the event of a power failure, and it is problematic in that the smart plugs may not be selected in real time according to changing criteria because their priorities are determined in advance. (Korean Patent Application Publication No. 10-2015-0057728, published on May 28, 2015 and titled "Method for operating smart outlet and smart monitoring and display devices based on information devices that work with ESS and bidirectional power transmission control module based on priority".)

SUMMARY OF THE INVENTION

An object of the present invention is to enable a power failure to be prevented using power generated only through solar power generation when the supply of power from a power system is interrupted because failure has occurred therein.

Another object of the present invention is to partially supply power by appropriately interrupting the supply of power exceeding power demand by comparing the power demand with the amount of power generated through solar power generation.

A further object of the present invention is to monitor a load profile for each load and to thereby appropriately interrupt the supply of power to each load when failure has occurred in a power system.

In order to accomplish the above object, a method for power management according to the present invention includes acquiring load amount information for each of multiple loads corresponding to power management targets; checking a maximum amount of power that is capable of being generated by a solar power generator; setting a power supply mode based on at least one of whether power is being supplied from a power system and a result of a comparison of the load amount information with the maximum amount of power that is capable of being generated; and performing power management so as to prevent a power failure by interrupting a supply of power so as to correspond to the power supply mode based on multiple smart plugs for controlling corresponding ones of the multiple loads.

Here, acquiring the load amount information may include, for each of the multiple loads, comparing a first load amount, corresponding to a current time, with a second load amount, estimated to be used at the current time, based on a load profile for each load, included in the load amount information; and classifying the multiple loads into classes depending on a result of the comparison.

Here, classifying the multiple loads may include classifying a load that satisfies a condition in which a difference between the first load amount and the second load amount falls within a preset error range, among the multiple loads, into a first class; classifying a load that satisfies a condition in which the difference falls out of the preset error range, among the multiple loads, into a second class; and classifying a load, the first load amount of which is equal to or less than a preset amount, among the multiple loads, into a third class.

Here, setting the power supply mode may be configured to set the power supply mode to a system link mode when voltage is supplied from the power system, and to set the power supply mode to a solar power stand-alone mode when voltage is not supplied from the power system.

Here, performing the power management may include performing power interruption based on the class when the power supply mode is the solar power stand-alone mode.

Here, performing the power management may be configured to supply power to all of the multiple loads by controlling all of the multiple smart plugs so as to be turned on when the power supply mode is the system link mode.

Here, performing the power management may include a first power interruption phase in which a supply of power to loads classified into the third class is interrupted when a total of load amounts of the first, second, and third classes is greater than the maximum amount of power; a second power interruption phase in which a supply of power to loads classified into the second and third classes is interrupted when a total of load amounts of the first and second classes is greater than the maximum amount of power; and a third power interruption phase in which a supply of power to loads classified into the second and third classes is interrupted but low voltage is supplied to loads classified into the first class when a load amount of the first class is greater than the maximum amount of power.

Here, performing the power interruption may be configured to interrupt a supply of power in such a way that, among the multiple smart plugs, smart plugs of loads corresponding to a class determined to be a target of power interruption are controlled so as to be turned off.

Here, setting the power supply mode may be configured to set the power supply mode to a low-voltage solar power stand-alone mode when the third power interruption phase is started in the solar power stand-alone mode.

Here, performing the power management may be configured to supply power in a form of voltage but not current when the power supply mode is any one of the solar power stand-alone mode and the low-voltage solar power stand-alone mode.

Also, an apparatus for power management according to an embodiment of the present invention includes multiple smart plugs for controlling power to be supplied to multiple loads, corresponding to power management targets, and acquiring load amount information for each of the multiple loads; a multi-mode inverter for supplying power generated from at least one of a power system and a solar power generator to the multiple loads in various modes and checking a maximum amount of power that is capable of being generated by the solar power generator; and a control unit for setting a power supply mode based on at least one of whether power is being supplied from the power system and a result of a comparison of the load amount information with the maximum amount of power and performing power management so as to prevent a power failure by interrupting a supply of power so as to correspond to the power supply mode.

Here, the control unit may include an analysis unit for comparing a first load amount, corresponding to a current time, with a second load amount, estimated to be used at the current time, based on a load profile for each load, included in the load amount information, for each of the multiple loads; and a classification unit for classifying the multiple loads into classes depending on a result of the comparison of the first load amount with the second load amount.

Here, the classification unit may be configured to classify a load that satisfies a condition in which a difference between the first load amount and the second load amount falls within a preset error range, among the multiple loads, into a first class, to classify a load that satisfies a condition in which the difference falls out of the preset error range, among the multiple loads, into a second class, and to classify a load, the first load amount of which is equal to or less than a preset amount, among the multiple loads, into a third class.

Here, the control unit may be configured to set the power supply mode to a system link mode when voltage is supplied from the power system, and to set the power supply mode to a solar power stand-alone mode when voltage is not supplied from the power system.

Here, the control unit may perform power interruption by controlling the multiple smart plugs based on the class when the power supply mode is the solar power stand-alone mode.

Here, the control unit may supply power to all of the multiple loads by controlling all of the multiple smart plugs so as to be turned on when the power supply mode is the system link mode.

Here, the control unit may be configured to perform first power interruption through which a supply of power to loads classified into the third class is interrupted when a total of load amounts of the first, second, and third classes is greater than the maximum amount of power, to perform second power interruption through which a supply of power to loads classified into the second and third classes is interrupted when a total of load amounts of the first and second classes is greater than the maximum amount of power, and to perform third power interruption through which a supply of power to loads classified into the second and third classes is interrupted but low voltage is supplied to loads classified into the first class when a load amount of the first class is greater than the maximum amount of power.

Here, the control unit may interrupt a supply of power in such a way that, among the multiple smart plugs, smart plugs of loads corresponding to a class determined to be a target of power interruption are controlled so as to be turned off.

Here, the control unit may set the power supply mode to a low-voltage solar power stand-alone mode when the third power interruption is performed in the solar power stand-alone mode.

Here, the control unit may supply power in a form of voltage but not current when the power supply mode is any one of the solar power stand-alone mode and the low-voltage solar power stand-alone mode.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
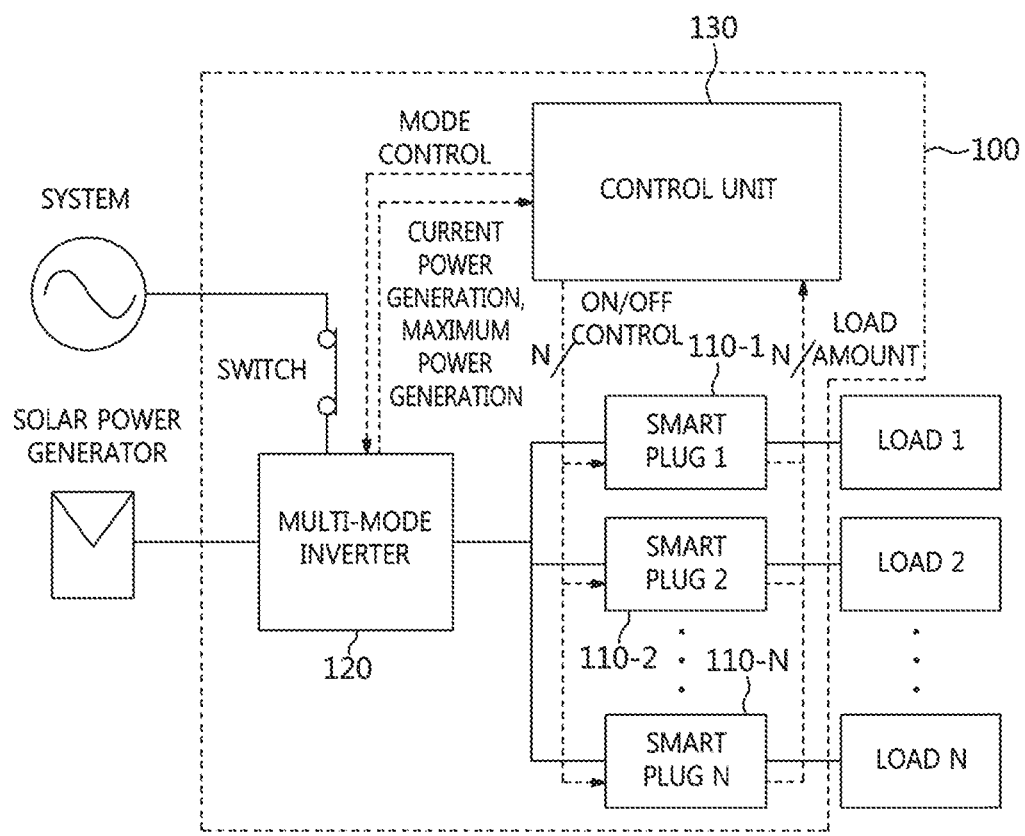
FIG. 1 is a block diagram in which a smart plug-based power management apparatus for preventing a power failure according to an embodiment of the present invention is illustrated based on the whole system.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a block diagram in which a smart plug-based power management apparatus for preventing a power failure according to an embodiment of the present invention is illustrated based on an entire system.

Referring to FIG. 1, a smart plug-based power management apparatus 100 for preventing a power failure according to an embodiment of the present invention includes multiple smart plugs 110-1 to 110-N, a multi-mode inverter 120, and a control unit 130.

Hereinafter, based on the operation of the entire system illustrated in FIG. 1, a power management apparatus 100 according to an embodiment of the present invention will be described.

The multiple smart plugs 110-1 to 110-N control power to be supplied to corresponding ones among multiple loads, which are power management targets, and acquire load amount information for the corresponding ones of the multiple loads.

For example, the smart plug 1 110-1 illustrated in FIG. 1 may supply power or interrupt the supply of power to the load 1. Also, the smart plug 2 110-2 may supply power or interrupt the supply of power to the load 2. That is, the multiple smart plugs 110-1 to 110-N may be present in a number corresponding to the number of multiple loads.

Here, the turn-on or turn-off operations of the multiple smart plugs 110-1 to 110-N may be controlled by the control unit 130 based on the power supply mode of the multi-mode inverter 120. Also, the operations of the multiple smart plugs 110-1 to 110-N may be controlled in consideration of the maximum amount of power that can be generated in the solar power generator illustrated in FIG. 1 and the load amounts of the multiple loads.

The multi-mode inverter 120 supplies power generated from at least one of a power system and a solar power generator to the multiple loads in various modes and checks the maximum amount of power that can be generated through the solar power generator.

Here, the multi-mode inverter 120 may be connected with the power system via a separate switch, as shown in FIG. 1.

Here, the separate switch may be turned on or off by the control unit 130. For example, after it detects that power is not supplied from the power system due to a fault therein, the control unit 130 may interrupt the link between the solar power generator and the power system by changing the switch to an OFF state.

Accordingly, depending on whether the power system is linked with the solar power generator, the multi-mode inverter 120 according to the present invention may supply power acquired from both the power system and the solar power generator or power acquired only from the solar power generator to the multiple loads through the multiple smart plugs 110-1 to 110-N.

Here, the multi-mode inverter 120 may deliver information about the amount of power that is currently being supplied and information about the maximum amount of power that can be generated through the solar power generator to the control unit 130.

Here, the amount of power that is currently being supplied may be greater than the maximum amount of power that can be generated through the solar power generator depending on whether the multi-mode inverter 120 is connected with the power system.

Here, the multi-mode inverter 120 may operate depending on a power supply mode set by the control unit 130.

Here, the power supply mode may be set to a system link mode in which the multi-mode inverter 120 is connected with the power system via a switch, a solar power stand-alone mode or a low-voltage solar power stand-alone mode in which power is supplied only from the solar power generator because the switch between the multi-mode inverter 120 and the power system is turned off, or the like.

Here, if the power supply mode is set to a system link mode, the multi-mode inverter 120 may be supplied with voltage from the power system at the same time that it is supplied with current from the solar power generator.

Also, if the power supply mode is set to a solar power stand-alone mode or a low-voltage solar power stand-alone mode, the multi-mode inverter 120 may be supplied with power in the form of electric current or voltage from the solar power generator.

The control unit 130 sets the power supply mode based on at least one of whether power is being supplied from the power system and the result of a comparison of load amount information with the maximum power generation of the solar power generator and performs power management in order to prevent a power failure by interrupting the supply of power so as to correspond to the power supply mode.

Here, for each of the multiple loads, a first load amount used at the current time is compared with a second load amount estimated to be used at the current time based on a load profile for each load, included in the load amount information.

Here, the second load amount of a load may be estimated using its load profile in consideration of the time at which the load is generated. For example, the load profile for each load may include information about the time of day at which each load is generated. Accordingly, hourly load generation information about the time of day at which each of the loads is usually generated may be generated using a load profile.

Also, the hourly load generation information is regularly updated and managed using the load amount information acquired from the multiple smart plugs 110-1 to 110-N, and the second load amount may be estimated using the latest hourly load generation information.

Here, the multiple loads may be classified into classes depending on the result of comparison of the first load amount with the second load amount.

Here, among the multiple loads, a load that satisfies the condition in which the difference between the first load amount thereof and the second load amount thereof falls within a preset error range may be classified into a first class. That is, a load within a predictable range, that is, a load determined to have a current load amount that is similar to the load amount estimated using the load profile, may be classified into the first class.

Here, among the multiple loads, a load that satisfies the condition in which the difference between the first load amount thereof and the second load amount thereof falls out of the preset error range may be classified into a second class. That is, an unexpected load, that is, a load determined to have a current load amount that differs from the load amount estimated using the load profile, may be classified into the second class.

Here, among multiple loads, a load, the first load amount of which is equal to or less than a preset amount, may be classified into a third class. Here, the load classified into the third class may be a load determined to consume little power, and the preset amount may be set close to 0.

Here, when voltage is supplied from the power system, the power supply mode may be set to a system link mode, but when no voltage is supplied from the power system, the power supply mode may be set to a solar power stand-alone mode.

Here, when the power supply mode is a solar power stand-alone mode, power interruption may be performed by controlling the multiple smart plugs 110-1 to 110-N based on the class.

That is, when a solar power stand-alone mode is set, power generated only through the solar power generator may be supplied to the multiple loads. Therefore, the load amounts of the multiple loads are checked, and power interruption may be performed when necessary.

Here, when the total of the load amounts of the first, second, and third classes is greater than the maximum power generation, first power interruption, through which the supply of power to the loads classified into the third class is interrupted, may be performed.

Here, the total of the load amounts of the first, second, and third classes corresponds to the total of the load amounts of all the loads. Therefore, when the total of the load amounts of all the loads exceeds the maximum power generation, the supply of power to the loads classified into the third class, which are determined to consume no power or little power, is interrupted, whereby power may be normally supplied to the loads classified into the first and second classes.

Here, when the total of the load amount of the first and second classes is greater than the maximum power generation, second power interruption, through which the supply of power to the loads classified into the second and third classes is interrupted, may be performed.

Here, the first class corresponds to the predicted loads based on the current time, and the second class corresponds to the loads that are generated but not predicted based on the current time. Therefore, if the total of the load amounts of the first and second classes is greater than the maximum power generation, the supply of power to the loads classified into the second class, which are generated although not predicted, may be interrupted.

Here, when the load amount of the first class is greater than the maximum power generation, third power interruption, through which the supply of power to the loads classified into the second and third classes is interrupted but low voltage is supplied to the loads classified into the first class, may be performed.

That is, when the amount of the load predicted to be generated at the current time is greater than the maximum power generation, low-level voltage is supplied only to the loads classified into the first class, whereby some of the loads classified into the first class stop their operations so that no power is consumed therefor, or the loads may be forced to consume less power compared to when power is supplied normally.

Here, the supply of power may be interrupted in such a way that smart plugs for the loads classified into the class determined to be a target of power interruption are controlled so as to be turned off, among the multiple smart plugs 110-1 to 110-N.

Here, when the third power interruption is performed in the solar power stand-alone mode, the power supply mode may be set to a low-voltage solar power stand-alone mode.

Here, when the power supply mode is any one of a solar power stand-alone mode and a low-voltage solar power stand-alone mode, power may be supplied in the form of voltage but not current.

Here, when the power supply mode is a system link mode, power may be supplied to the multiple loads by controlling the multiple smart plugs 110-1 to 110-N so as to be turned on. That is, when power is smoothly supplied because there is no problem with the power system, there is no need to perform power interruption, and all the smart plugs are controlled so as to be turned on, whereby power may be supplied to all the loads.

Through the power management apparatus configured as described above, even when power is not supplied from a power system due to the occurrence of a failure therein, power may be continuously generated and supplied through a solar power generator, whereby a power failure may be prevented.

Figure 2:
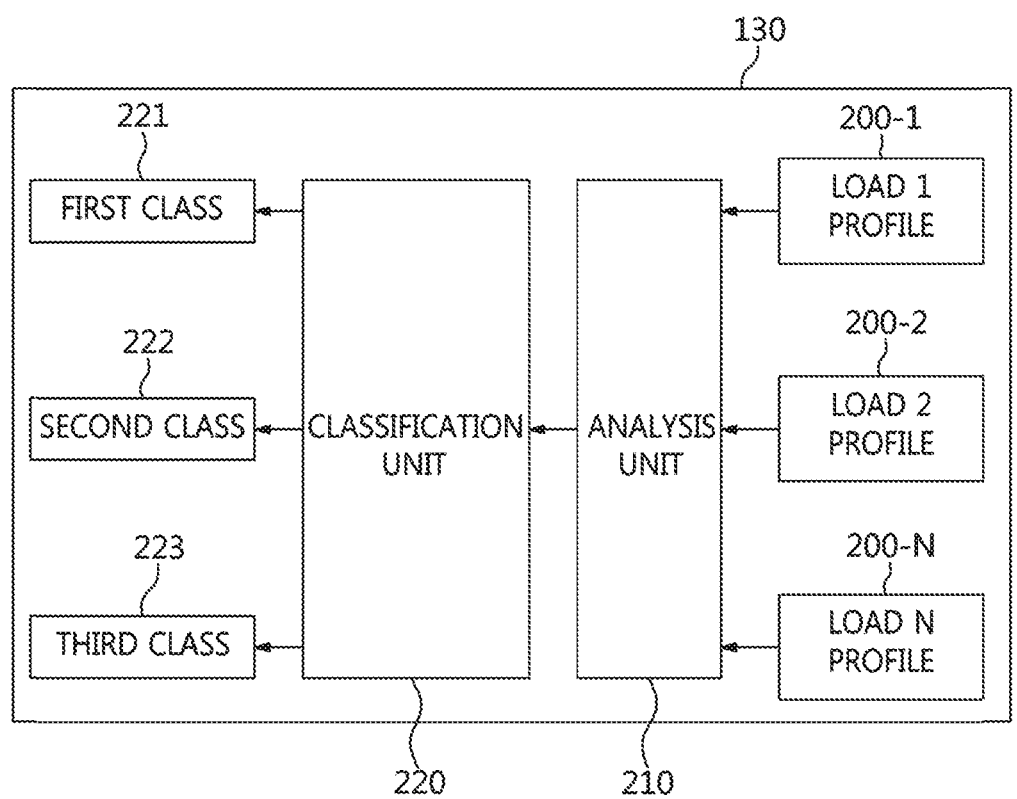
FIG. 2 is a block diagram that shows an example of the control unit illustrated in FIG. 1.

FIG. 2 is a block diagram that shows an example of the control unit illustrated in FIG. 1.

Referring to FIG. 2, the control unit 130 illustrated in FIG. 1 includes an analysis unit 210 and a classification unit 220.

For each of the multiple loads, the analysis unit 210 compares a first load amount used at the current time with a second load amount estimated to be used at the current time based on load profiles 200-1 to 200-N for the respective loads, included in load amount information.

Here, the second load amount may be estimated using the load profiles 200-1 to 200-N in consideration of the time at which each of the multiple loads is generated. For example, the load profile for each load may include information about the time of day at which the load is generated. Accordingly, hourly load generation information about the time of day at which each of the loads is usually generated may be generated using the load profiles 200-1 to 200-N.

Also, the hourly load generation information is regularly updated and managed using the load amount information acquired from the multiple smart plugs, and the second load amount may be estimated using the latest hourly load generation information.

The classification unit 220 classifies the multiple loads into classes depending on the result of comparison of the first load amount with the second load amount.

Here, among the multiple loads, a load that satisfies the condition in which the difference between the first load amount thereof and the second load amount thereof falls within a preset error range may be classified into a first class 221. That is, a load within a predictable range, that is, a load determined to have a current load amount that is similar to the load amount estimated using the load profile, may be classified into the first class 221.

Here, among the multiple loads, a load that satisfies the condition in which the difference between the first load amount thereof and the second load amount thereof falls out of the preset error range may be classified into a second class 222. That is, an unexpected load, that is, a load determined to have a current load amount that differs from the load amount estimated using the load profile, may be classified into the second class 222.

Here, among multiple loads, a load, the first load amount of which is equal to or less than a preset amount, may be classified into a third class 223. Here, the load classified into the third class 223 may be a load determined to consume little power, and the preset amount may be set close to 0.

Figure 3:
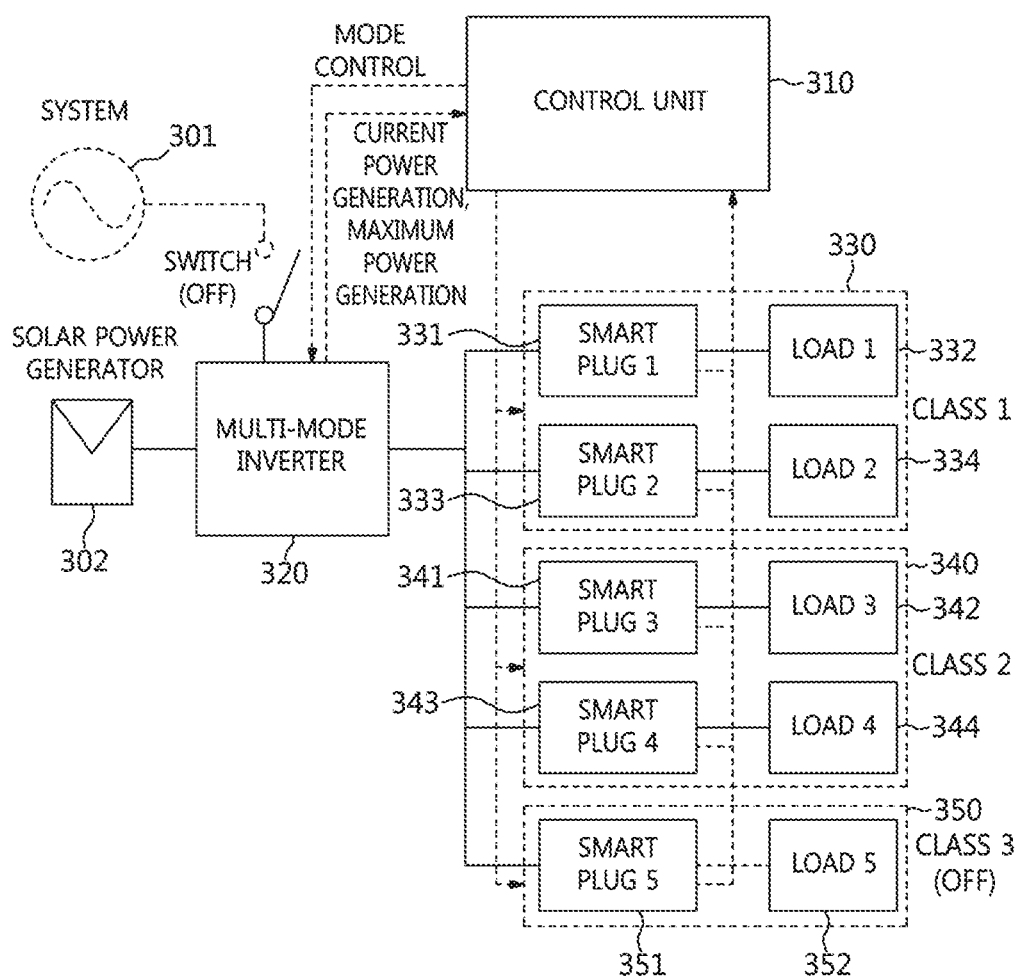
FIGS. 3 to 5 are views that show an example of phased power interruption according to the present invention.
Figure 4:
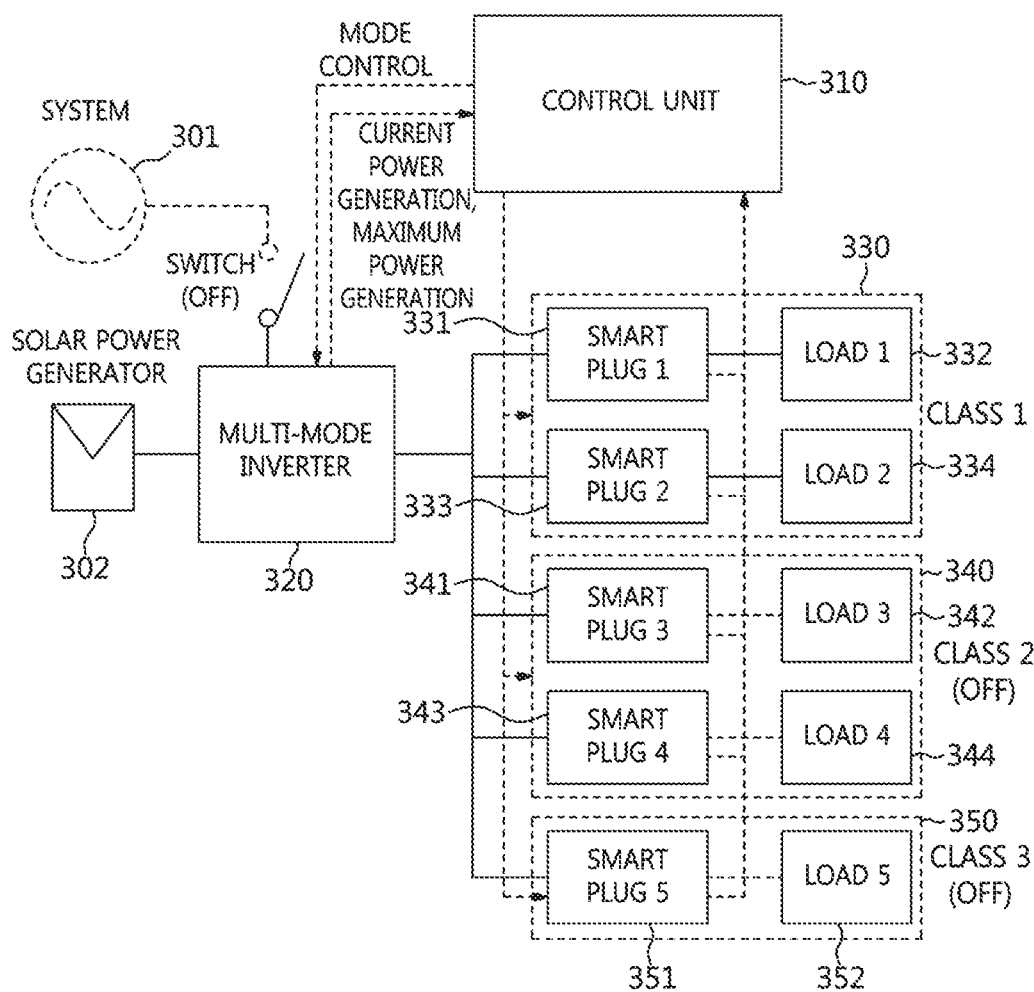
Figure 5:
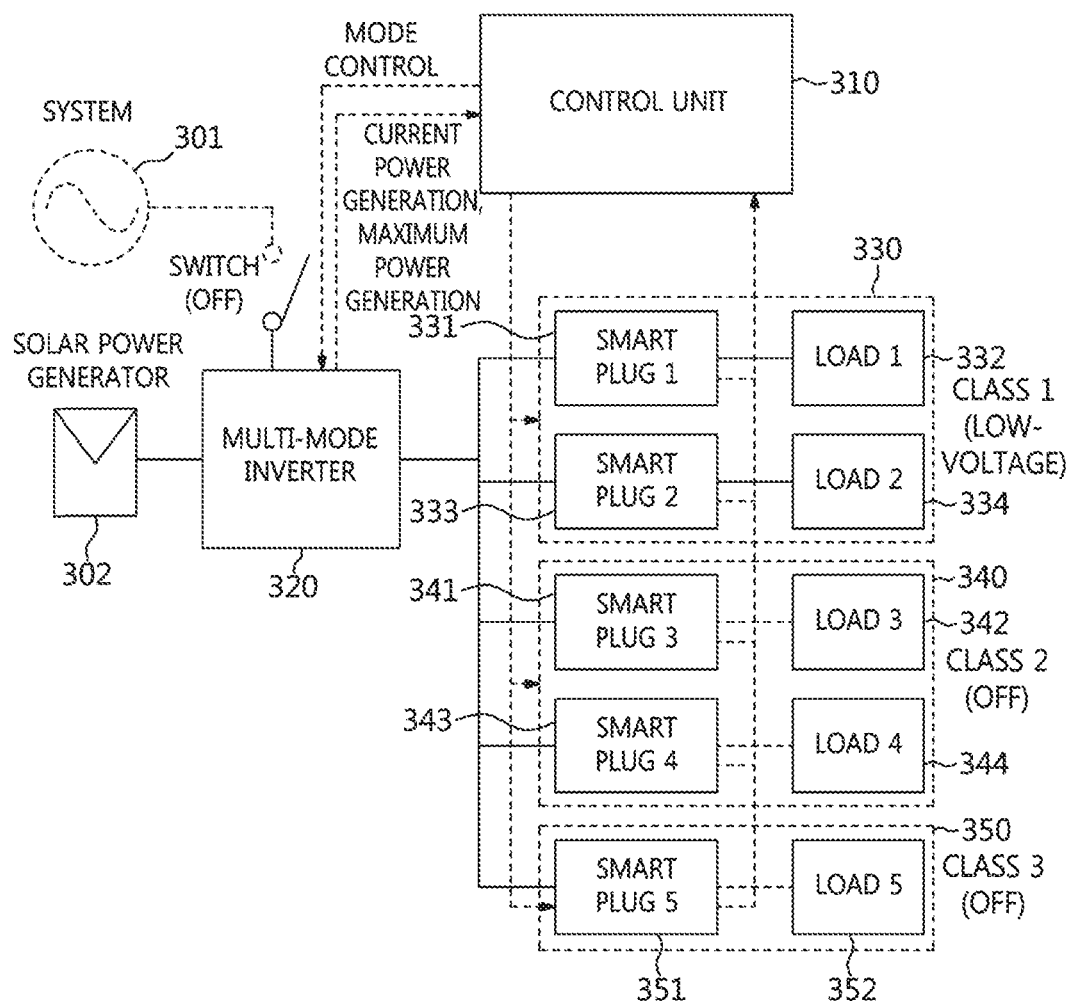

FIGS. 3 to 5 are views that show an example of phased power interruption according to the present invention.

Referring to FIGS. 3 to 5, the multi-mode inverter 320 is disconnected from the power system 301, and power is supplied only from the solar power generator 302. That is, it is necessary to perform power interruption depending on the load amounts of a load 1 322 to a load 5 352, for which the supply of power is required.

For example, if the total of load amounts corresponding to the first class 330, the second class 340, and the third class 350 is greater than the maximum power generation of the solar power generator 302, the smart plug 5 351 is controlled so as to be turned off, as shown in FIG. 3, whereby the supply of power to the load 5 352 classified into the third class may be interrupted.

In another example, if the total of the load amounts corresponding to the first class 330 and the second class 340, exclusive of the load amount of the third class 350, is greater than the maximum power generation of the solar power generator 302, the smart plug 3 341, the smart plug 4 343, and the smart plug 5 351 are controlled so as to be turned off, as shown in FIG. 4, whereby the supply of power to the load 3 342, the load 4 344, and the load 5 352, classified into the second and third classes, may be interrupted.

In another example, if only the load amount of the first class 330 exceeds the maximum power generation of the solar power generator 302, the smart plug 3 341, the smart plug 4 343, and the smart plug 5 351 are controlled so as to be turned off, as shown in FIG. 5, whereby the supply of power to the load 3 342, the load 4 344, and the load 5 352, classified into the second and third classes, is interrupted, but low-voltage power may be supplied to the load 1 332 and the load 2 334, classified into the first class.

Figure 6:
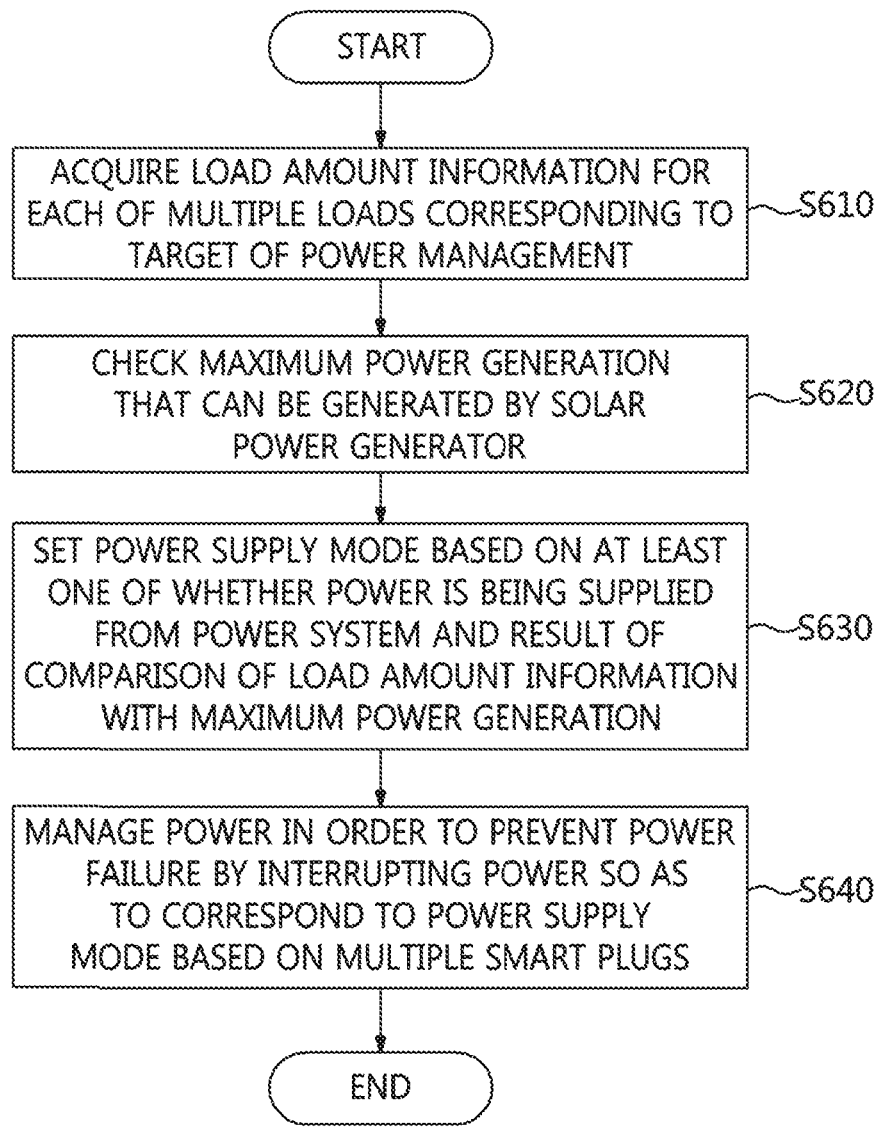
FIG. 6 is a flowchart that shows a smart plug-based power management method for preventing a power failure according to an embodiment of the present invention.

FIG. 6 is a flowchart that shows a smart plug-based power management method for preventing a power failure according to an embodiment of the present invention.

Referring to FIG. 6, in the smart plug-based power management method for preventing a power failure according to an embodiment of the present invention, load amount information for each of multiple loads, for which power management is performed, may be acquired at step S610.

Here, the load amount information may be acquired through multiple smart plugs that control the supply of power to corresponding ones of the multiple loads.

Therefore, the multiple smart plugs may be present so as to correspond to the number of the multiple loads.

Here, for each of the multiple loads, a first load amount used at the current time is compared with a second load amount estimated to be used at the current time based on a load profile for each load, included in the load amount information, and the multiple loads may be classified into classes depending on the result of the comparison.

For example, the load profile for each load may include information about the time of day at which each load is generated. Accordingly, hourly load generation information about the time of day at which each of the loads is usually generated may be generated using a load profile. Also, the hourly load generation information is regularly updated and managed using the load amount information acquired from the multiple smart plugs, and the second load amount may be estimated using the latest hourly load generation information.

Here, among the multiple loads, a load that satisfies the condition in which the difference between the first load amount thereof and the second load amount thereof falls within a preset error range may be classified into a first class. That is, a load within a predictable range, that is, a load determined to have a current load amount that is similar to the load amount estimated using the load profile, may be classified into the first class.

Also among the multiple loads, a load that satisfies the condition in which the difference between the first load amount thereof and the second load amount thereof falls out of the preset error range may be classified into a second class. That is, an unexpected load, that is, a load determined to have a current load amount that differs from the load amount estimated using the load profile, may be classified into the second class.

Also, among the multiple loads, a load, the first load amount of which is equal to or less than a preset amount, may be classified into a third class. Here, the load classified into the third class may be a load determined to consume little power, and the preset amount may be set close to 0.

Also, in the smart plug-based power management method for preventing a power failure according to an embodiment of the present invention, the maximum amount of power that can be generated by a solar power generator is checked at step S620.

Here, the maximum amount of power that can be generated by the solar power generator is checked by a multi-mode inverter, and may then be delivered to the control unit.

Here, the amount of power currently being supplied may also be checked and delivered to the control unit along with information about the maxim power generation of the solar power generator.

Here, the amount of power currently being supplied may be greater than the maximum power generation of the solar power generator depending on whether the multi-mode inverter is connected with a power system.

Also, in the smart plug-based power management method for preventing a power failure according to an embodiment of the present invention, a power supply mode is set at step S630 based on at least one of whether power is being supplied from the power system and the result of comparison of the load amount information with the maximum power generation.

Here, the power supply mode may be set to a system link mode, in which the multi-mode inverter is connected with the power system via a switch, a solar power stand-alone mode or a low-voltage solar power stand-alone mode, in which power is supplied only from the solar power generator because the switch between the multi-mode inverter and the power system is turned off, or the like.

Here, when voltage is supplied from the power system, the power supply mode is set to a system link mode, and when voltage is not supplied from the power system, the power supply mode may be set to a solar power stand-alone mode.

Also, in the smart plug-based power management method for preventing a power failure according to an embodiment of the present invention, power management is performed at step S640 in order to prevent a power failure by interrupting the supply of power so as to correspond to the set power supply mode based on multiple smart plugs for controlling corresponding ones among the multiple loads.

Here, when the power supply mode is a solar power stand-alone mode, power interruption may be performed based on a class. That is, when a solar power stand-alone mode is set, only power generated through the solar power generator may be supplied to the multiple loads. Accordingly, the load amounts of the multiple loads are checked, and power interruption may be performed when necessary.

Here, when the total of the load amounts of the first, second, and third classes is greater than the maximum power generation, first power interruption, through which the supply of power to the loads classified into the third class is interrupted, may be performed.

Here, the total of the load amounts of the first, second, and third classes may be the total of the load amounts of all the loads. Therefore, when the total of the load amounts of all the loads exceeds the maximum power generation, the supply of power to the loads classified into the third class, determined to consume no power or little power, is interrupted, whereby power may be supplied normally to the loads classified into the first and second classes.

Also, when the total of the load amounts of the first and second classes is greater than the maximum power generation, second power interruption, through which the supply of power to the loads classified into the second and third classes is interrupted, may be performed.

Here, the first class may correspond to the predicted loads based on the current time, and the second class may correspond to loads that are generated but not predicted based on the current time. Therefore, when the total of the load amounts of the first and second classes is greater than the maximum power generation, the supply of power to the loads classified into the second class, which are generated although not predicted, may be interrupted.

Also, when the load amount of the first class is greater than the maximum power generation, third power interruption, through which the supply of power to the loads classified into the second and third classes is interrupted but low voltage is supplied to the loads classified into the first class, may be performed.

That is, when the amount of the loads predicted to be generated at the current time is greater than the maximum power generation, low-level voltage is supplied only to the loads classified into the first class, whereby some of the loads classified into the first class stop their operations so that no power is consumed therefor, or the loads may be forced to consume less power compared to when power is supplied normally.

Here, among the multiple smart plugs, smart plugs for the loads classified into the class determined to be the target of power interruption are controlled so as to be turned off, whereby the supply of power thereto may be interrupted.

Here, when the third power interruption is performed in the solar power stand-alone mode, the power supply mode may be set to a low-voltage solar power stand-alone mode.

Here, when the power supply mode is any one of a solar power stand-alone mode and a low-voltage solar power stand-alone mode, power may be supplied in the form of voltage rather than in the form of current.

Here, when the power supply mode is a system link mode, power may be supplied to all of the multiple loads by controlling all of the multiple smart plugs so as to be turned on. That is, when power is smoothly supplied because there is no problem with the power system, there is no need to perform power interruption, and all the smart plugs are controlled so as to be turned on, whereby power may be supplied to all the loads.

As power management is performed through the power management method configured as described above, even when power is not supplied from a power system due to the occurrence of a failure therein, power may be continuously generated and supplied through a solar power generator, whereby a power failure may be prevented.

Figure 7:
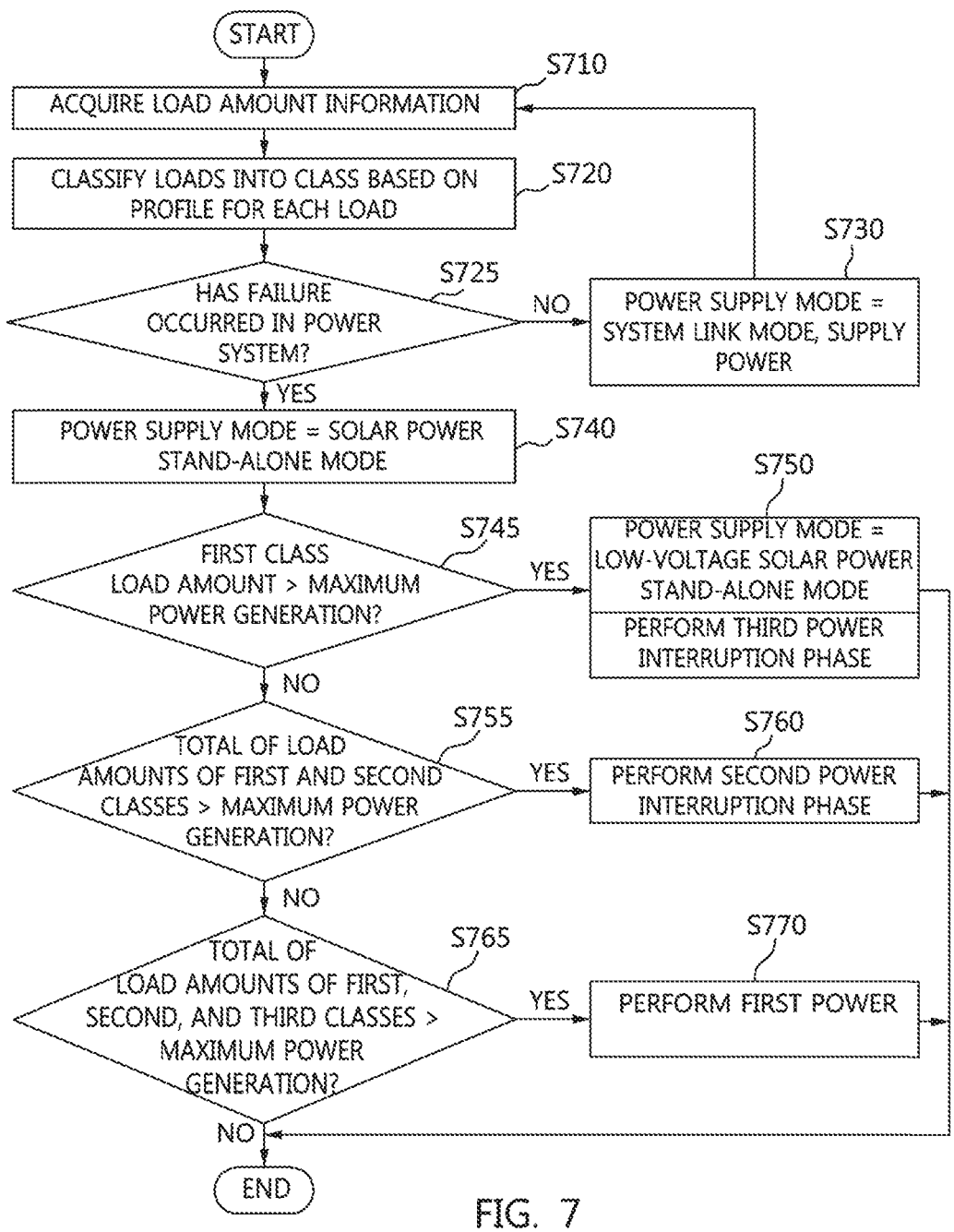
FIG. 7 is a flowchart that specifically shows a smart plug-based power management method for preventing a power failure according to an embodiment of the present invention.

FIG. 7 is a flowchart that specifically shows a smart plug-based power management method for preventing a power failure according to an embodiment of the present invention.

Referring to FIG. 7, in the smart plug-based power management method for preventing a power failure according to an embodiment of the present invention, load amount information for each of multiple loads, which are power management targets, may be acquired at step S710.

Here, the multiple loads may be classified based on a load profile for each load at step S720.

Here, for each of the multiple loads, a first load amount used at the current time is compared with a second load amount estimated to be used at the current time, and the multiple loads may be classified into classes depending on the result of the comparison.

Here, among the multiple loads, a load that satisfies the condition in which the difference between a first load amount thereof and a second load amount thereof falls within a preset error range may be classified into a first class.

Also, among the multiple loads, a load that satisfies the condition in which the difference between a first load amount thereof and a second load amount thereof falls out of the preset error range may be classified into a second class.

Also, among the multiple loads, a load, a first load amount of which is equal to or less than a preset amount, may be classified into a third class.

Subsequently, whether failure has occurred in the power system is determined at step S725, and when the power system is operated normally and is connected with the multi-mode inverter, the power supply mode is set to a system link mode and power may be supplied to the multiple loads at step S730.

Also, when it is determined at step S725 that failure has occurred in the power system and the multi-mode inverter is disconnected from the power system, the power supply mode may be set to a solar power stand-alone mode at step S740.

Subsequently, whether the load amount of the first class exceeds the maximum power generation of the solar power generator may be determined at step S745.

When it is determined at step S745 that the load amount of the first class exceeds the maximum power generation, the power supply mode is set to a low-voltage solar power stand-alone mode, and a third power interruption phase may be performed at step S750.

That is, the supply of power to the loads classified into the second and third classes is interrupted, but low voltage may be supplied to the loads classified into the first class.

Also, when it is determined at step S745 that the load amount of the first class does not exceed the maximum power generation, whether the total of the load amounts of the first and second classes exceeds the maximum power generation may be determined at step S755.

When it is determined at step S755 that the total of the load amounts of the first and second classes exceeds the maximum power generation, a second power interruption phase may be performed at step S760.

That is, the supply of power to the loads classified into the second and third classes may be interrupted.

Also, when it is determined at step S755 that the total of the load amounts of the first and second classes does not exceed the maximum power generation, whether the total of the load amounts of the first, second, and third classes exceeds the maximum power generation may be determined at step S765.

When it is determined at step S765 that the total of the load amounts of the first, second, and third classes exceeds the maximum power generation, a first power interruption phase may be performed at step S770.

That is, the supply of power to the load classified into the third class may be interrupted.

Also, when it is determined at step S765 that the total of the load amounts of the first, second, and third classes does not exceed the maximum power generation, power interruption may not be performed.

According to the present invention, even when the supply of power from a power system is interrupted due to the occurrence of a failure therein, a power failure may be prevented using power generated only through solar power generation.

Also, according to the present invention, power demand is compared with the amount of power generated through solar power generation and the supply of power exceeding the power demand is appropriately interrupted, whereby the partial supply of power is possible.

Also, according to the present invention, a load profile is monitored for each load, whereby the supply of power to each load may be appropriately interrupted when failure has occurred in a power system.

As described above, the smart plug-based power management apparatus and method for preventing a power failure according to the present invention are not limitedly applied to the configurations and operations of the above-described embodiments, but all or some of the embodiments may be selectively combined and configured, so that the embodiments may be modified in various ways.

What is claimed is:

1. A method for power management, comprising:
    acquiring load amount information for each of multiple loads corresponding to power management targets;
    checking a maximum amount of power that is capable of being generated by a solar power generator;
    setting a power supply mode based on at least one of whether power is being supplied from a power system and a result of comparison of the load amount information with the maximum amount of power that is capable of being generated by the solar power generator; and
    performing power management so as to prevent a power failure by interrupting a supply of power so as to correspond to the power supply mode based on multiple smart plugs for controlling corresponding ones of the multiple loads,
    wherein acquiring the load amount information comprises:
    for each of the multiple loads, comparing a first load amount, corresponding to a current time, with a second load amount, estimated to be used at the current time, based on a load profile for each load, included in the load amount information; and
    classifying the multiple loads into classes depending on a result of the comparison,
    wherein classifying the multiple loads comprises:
    classifying a load that satisfies a condition in which a difference between the first load amount and the second load amount falls within a preset error range, among the multiple loads, into a first class;
    classifying a load that satisfies a condition in which the difference falls out of the preset error range, among the multiple loads, into a second class; and
    classifying a load, the first load amount of which is equal to or less than a preset amount, among the multiple loads, into a third class.

2. The method of claim 1, wherein setting the power supply mode is configured to:
    set the power supply mode to a system link mode when voltage is supplied from the power system; and
    set the power supply mode to a solar power stand-alone mode when voltage is not supplied from the power system.

3. The method of claim 2, wherein performing the power management comprises performing power interruption based on the class when the power supply mode is the solar power stand-alone mode.

4. The method of claim 2, wherein performing the power management is configured to supply power to all of the multiple loads by controlling all of the multiple smart plugs so as to be turned on when the power supply mode is the system link mode.

5. The method of claim 3, wherein performing the power management comprises:
    a first power interruption phase in which a supply of power to loads classified into the third class is interrupted when a total of load amounts of the first, second, and third classes is greater than the maximum amount of power;
    a second power interruption phase in which a supply of power to loads classified into the second and third classes is interrupted when a total of load amounts of the first and second classes is greater than the maximum amount of power; and
    a third power interruption phase in which a supply of power to loads classified into the second and third classes is interrupted but low voltage is supplied to loads classified into the first class when a load amount of the first class is greater than the maximum amount of power.

6. The method of claim 5, wherein performing the power interruption is configured to interrupt a supply of power in such a way that, among the multiple smart plugs, smart plugs of loads corresponding to a class determined to be a target of power interruption are controlled so as to be turned off.

7. The method of claim 5, wherein setting the power supply mode is configured to set the power supply mode to a low-voltage solar power stand-alone mode when the third power interruption phase is started in the solar power stand-alone mode.

8. The method of claim 7, wherein performing the power management is configured to supply power in a form of voltage but not current when the power supply mode is any one of the solar power stand-alone mode and the low-voltage solar power stand-alone mode.

9. An apparatus for power management, comprising:
    multiple smart plugs for controlling power to be supplied to corresponding ones of multiple loads, corresponding to power management targets, and acquiring load amount information for each of the multiple loads;
    a multi-mode inverter for supplying power generated from at least one of a power system and a solar power generator to the multiple loads in various modes and checking a maximum amount of power that is capable of being generated by the solar power generator; and
    a control unit for setting a power supply mode based on at least one of whether power is being supplied from the power system and a result of a comparison of the load amount information with the maximum amount of power and performing power management so as to prevent a power failure by interrupting a supply of power so as to correspond to the power supply mode,
    wherein the control unit comprises:
    an analysis unit for comparing a first load amount, corresponding to a current time, with a second load amount, estimated to be used at the current time, based on a load profile for each load, included in the load amount information, for each of the multiple loads; and a classification unit for classifying the multiple loads into classes depending on a result of the comparison of the first load amount with the second load amount, wherein the classification unit is configured to:

classify a load that satisfies a condition in which a difference between the first load amount and the second load amount falls within a preset error range, among the multiple loads, into a first class;

classify a load that satisfies a condition in which the difference falls out of the preset error range, among the multiple loads, into a second class; and classify a load, the first load amount of which is equal to or less than a preset amount, among the multiple loads, into a third class.

10. The apparatus of claim 9, wherein the control unit is configured to:

set the power supply mode to a system link mode when voltage is supplied from the power system; and set the power supply mode to a solar power stand-alone mode when voltage is not supplied from the power system.

11. The apparatus of claim 10, wherein the control unit performs power interruption by controlling the multiple smart plugs based on the class when the power supply mode is the solar power stand-alone mode.

12. The apparatus of claim 10, wherein the control unit supplies power to all of the multiple loads by controlling all of the multiple smart plugs so as to be turned on when the power supply mode is the system link mode.

13. The apparatus of claim 11, wherein the control unit is configured to perform first power interruption through which a supply of power to loads classified into the third class is interrupted when a total of load amounts of the first, second, and third classes is greater than the maximum amount of power, to perform second power interruption through which a supply of power to loads classified into the second and third classes is interrupted when a total of load amounts of the first and second classes is greater than the maximum amount of power, and to perform third power interruption through which a supply of power to loads classified into the second and third classes is interrupted but low voltage is supplied to loads classified into the first class when a load amount of the first class is greater than the maximum amount of power.

14. The apparatus of claim 13, wherein the control unit interrupts a supply of power in such a way that, among the multiple smart plugs, smart plugs of loads corresponding to a class determined to be a target of power interruption are controlled so as to be turned off.

15. The apparatus of claim 13, wherein the control unit sets the power supply mode to a low-voltage solar power stand-alone mode when the third power interruption is performed in the solar power stand-alone mode.

16. The apparatus of claim 15, wherein the control unit supplies power in a form of voltage but not current when the power supply mode is any one of the solar power stand-alone mode and the low-voltage solar power stand-alone mode.

17. A method for power management, comprising:

acquiring load amount information for each of multiple loads corresponding to power management targets;

checking a maximum amount of power that is capable of being generated by a solar power generator;

setting a power supply mode based on at least one of whether power is being supplied from a power system and a result of comparison of the load amount information with the maximum amount of power that is capable of being generated by the solar power generator; and performing power management so as to prevent a power failure by interrupting a supply of power so as to correspond to the power supply mode based on multiple smart plugs for controlling corresponding ones of the multiple loads, wherein setting the power supply mode is configured to:

set the power supply mode to a system link mode when voltage is supplied from the power system; and set the power supply mode to a solar power stand-alone mode when voltage is not supplied from the power system.

18. The method of claim 17, wherein acquiring the load amount information comprises classifying the multiple loads into classes, and wherein performing the power management comprises performing power interruption based on the class when the power supply mode is the solar power stand-alone mode.

* * * * *